C. W. HURL.
AUTOMATIC FLUID PRESSURE RETAINING VALVE.
APPLICATION FILED MAY 3, 1909.
969,479.
Patented Sept. 6, 1910.
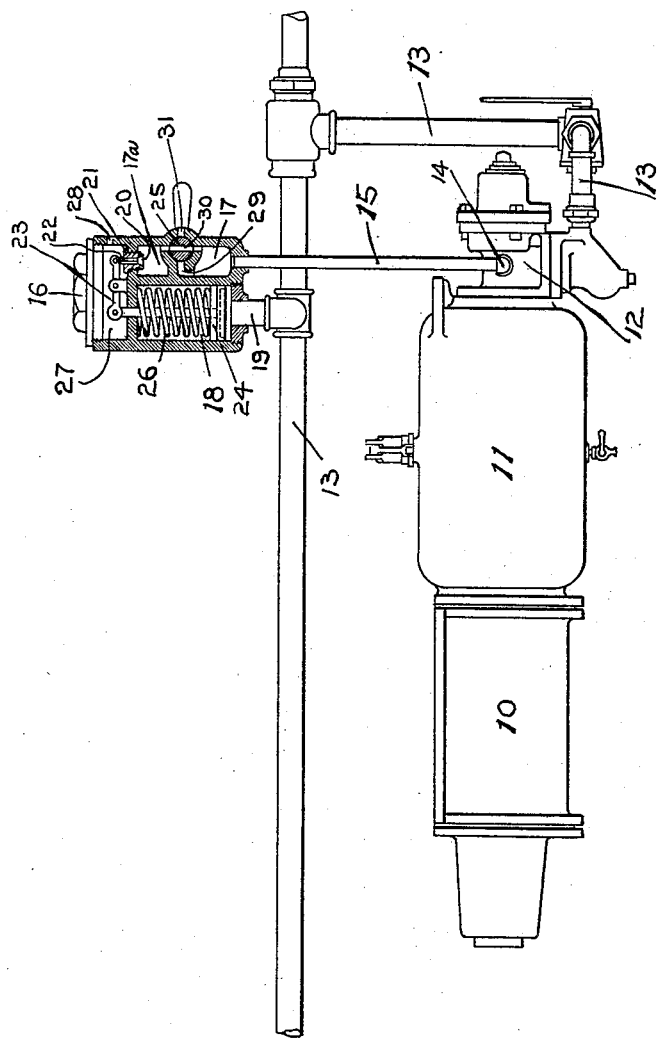

UNITED STATES PATENT OFFICE.

CHARLES W. HURL, OF ALTOONA, PENNSYLVANIA, ASSIGNOR OF ONE-FOURTH TO JOHN M. HENRY AND ONE-FOURTH TO JUSTICE C. TURNER, OF JUNIATA, PENNSYLVANIA.

AUTOMATIC FLUID-PRESSURE-RETAINING VALVE.

969,479.  Specification of Letters Patent.  Patented Sept. 6, 1910.

Application filed May 3, 1909. Serial No. 493,598.

*To all whom it may concern:*

Be it known that I, CHARLES W. HURL, a citizen of the United States, residing at Altoona, in the county of Blair and State of Pennsylvania, have invented certain new and useful Improvements in Automatic Fluid-Pressure-Retaining Valves, of which the following is a specification.

The object of my invention is to provide an improved automatic fluid pressure retaining valve to be used in connection with the air brake mechanism that is now commonly found on railway cars, and to this end it consists of improved means for controlling the exhaust of fluid under pressure from the air brake cylinder preventing the brake shoes from retracting from the wheels, thereby increasing the brake efficiency under running service conditions. This device is designed to be used in connection with the Westinghouse air brake, which will be briefly described in order that a clear understanding of the present invention may be obtained.

A steam driven air compressor on the locomotive supplies air at a predetermined pressure to the main air reservoirs usually located under the running boards of the modern locomotives. Through suitable piping the main air reservoir is in communication with the engineer's brake valve, which regulates the flow of air from the main air reservoir into the brake pipe for releasing the brakes, and from the main train or brake pipe to the atmosphere for applying the brakes. The train pipe is connected to the main air reservoir through the engineer's brake valve and extends throughout the length of the train, supplying the apparatus on each car with air. Located on each car is a small air reservoir, or auxiliary reservoir which takes air from the main air reservoir through the train pipe and stores it for its own use. This auxiliary reservoir is usually located near the brake cylinder which has its piston rod attached to the brake levers in such manner that when the piston is forced out by air pressure from the auxiliary reservoir, the brakes are applied. Located upon each car and suitably connected with the train pipe auxiliary reservoir and brake cylinder is the triple valve, which is operated by a variation of pressure in the brake pipe so as to admit air from the auxiliary reservoir to the brake cylinder, from whence the brakes are applied, at the same time cutting off communication from the brake pipe to the auxiliary reservoir, or to restore the supply of air from the train pipe to the auxiliary reservoir, at the same time the air in the brake cylinder escapes to the atmosphere.

Before the brakes are applied, the air pressures in the train pipe and auxiliary reservoir are equal and a movement of the engineer's brake valve handle to the right, first closes a port, retaining the pressure in the main air reservoirs on the locomotive, and simultaneously permits a portion of the air in the train pipe to escape into the atmosphere. This moderate reduction of air pressure in the train pipe causes the greater pressure remaining stored in the auxiliary reservoir to force the piston of the triple valve and its slide valve to a position which will allow the air in the auxiliary reservoir to pass directly into the brake cylinder and apply the brakes. The brakes having been applied and the engineer wishing to release the same, moves the handle to the extreme left which allows the air in the main reservoir to flow freely into the train pipe, restoring the lost pressure and releasing the brakes, the air in the brake cylinder passing back through the triple valve, and to the triple exhaust to the atmosphere.

From the foregoing, it will be seen that with the Westinghouse automatic brakes there is no way by which the engineer can recharge his auxiliary reservoirs and yet keep his brakes applied which is a very desirable feature in descending long grades with heavy trains.

The primary object of my invention is to provide means whereby the engineer is enabled to recharge his reservoirs with his brakes set, thus preventing the piling up of cars and the frequent pulling out of draw heads.

Referring to the accompanying drawings, the figure illustrates the usual Westinghouse brake cylinder, auxiliary reservoir, triple valve and train pipe together with my improved automatic pressure retaining valve attached thereto.

Like reference numerals represent corresponding parts in the drawings.

Referring to the various parts, the numeral 10 designates the brake cylinder in which is the usual piston, piston rod, and spring for drawing the brake shoes off the wheels after the brakes are released.

The numeral 11 designates the auxiliary reservoir in which the air is stored for use on the individual car to which it is attached, together with the triple valve 12, which is suitably connected to the train pipe 13, the auxiliary reservoir and the brake cylinder. Suitably connected to the air brake triple valve exhaust port 14 through the pipe 15 is my automatic pressure retaining valve, designated in its entirety by the numeral 16. This valve consists of two main chambers, one of which (17) communicates with the air brake triple valve exhaust, while the other (18) is in communication with the train pipe through the pipe 19.

In the upper portion of the chamber 17 is a single-acting controlling valve 20 which rests on a removable seat 21, said valve being connected through the stem 22 and simple lever 23 to the spring actuated piston 24 in chamber 18.

The operation of this automatic pressure retaining valve may be described as follows: The engineer in applying the brakes reduces the pressure in the train pipe 13, which action causes the triple valve to admit presure from the auxiliary reservoir 11 to the brake cylinder 10, thus applying the brakes. Referring particularly to the automatic retaining valve which is in communication with the triple valve exhaust and train pipe pressure which latter enters the chamber 18 beneath the piston 24 while the exhaust from the triple valve fills the lower chamber 17, passes through the two-way cock 25 to the upper chamber 17ª, where it is held by the valve 20. The spring 26 which has an abutment on the upper wall of the chamber 18 and its free end resting upon the piston 24 is graduated to resist a pressure slightly in excess of that contained in the train pipe. This excess pressure exerted by the spring keeps the valve 20 closed, thus preventing the escape of any air from the triple valve exhaust. After the brakes are set on the car and the engineer wishes to release the same, he moves the engineer's brake valve to such position that will allow air from the main air reservoir to enter the train pipe and overcome the excess pressure exerted by the spring 26. This being accomplished the piston 24 moves up and the valve 20 leaves its seat and the exhaust from the triple valve passes into the exhaust chamber 27 from whence it is also discharged through the port 28 to the atmosphere and the brakes are released. The auxiliary reservoir having been recharged from the train pipe and the brake shoes drawn away from the wheels, the engineer is again ready to apply the brakes in the usual way, by a reduction of air pressure in the train pipe through the operation of the engineer's brake valve. The pressure in the train pipe being reduced before the brakes can be applied the valve 20 closes through the action of the spring 26 as explained. The two-way cock is interposed between the chambers 17 and 17ª to enable train men to cut out the automatic feature of the valve and discharge the exhaust from the triple valve directly into the atmosphere through ports 29, 30 and 31, as shown in the drawings.

Without further description of my invention it is believed that the many advantages contained therein will be readily apparent.

I claim:

In a pressure retaining valve, the combination with the train pipe and triple valve, of a valve casing having two main chambers and an exhaust chamber, one of the main chambers being in communication with the train line, a cut-off valve arranged in one of the main chambers, a pipe connection between said latter chamber at one side of the cut-off valve and the triple valve exhaust, a single-acting controlling valve interposed between said exhaust chamber and said last mentioned main chamber at the opposite side of its cut-off valve, a pressure controlled piston arranged in the other main chamber and having a lever connection with said controlling valve, and a spring arranged to bear against said piston, said spring being graduated to resist pressure in excess of that contained in the train line.

In testimony whereof I hereunto affix my signature in the presence of two witnesses.

CHARLES W. HURL.

Witnesses:
ADAM LEAKE,
N. E. GEE.